(12) United States Patent
Jackson

(10) Patent No.: US 8,356,680 B2
(45) Date of Patent: Jan. 22, 2013

(54) FINAL DRIVE ASSEMBLY WITH SEAL GUARD FEATURES AND MACHINE USING SAME

(75) Inventor: Robert Jackson, Edwards, IL (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 12/959,942

(22) Filed: Dec. 3, 2010

(65) Prior Publication Data
US 2012/0138373 A1     Jun. 7, 2012

(51) Int. Cl.
*F16H 1/00*     (2006.01)
*B62D 55/12*    (2006.01)

(52) U.S. Cl. ........ 180/9.62; 180/337; 180/9.1; 384/478; 384/484; 384/486

(58) Field of Classification Search .............. 180/9.1; 277/35, 37, 25, 153, 188 R; 384/478, 484, 384/486; 475/331, 337
See application file for complete search history.

(56) References Cited

U.S. PATENT DOCUMENTS

| | | | |
|---|---|---|---|
| 3,540,743 A | 11/1970 | Ashton | |
| 3,905,607 A | 9/1975 | Maguire et al. | |
| 4,988,329 A * | 1/1991 | Lammers | 475/337 |
| 5,292,199 A | 3/1994 | Hosbach et al. | |
| 5,564,839 A * | 10/1996 | Ouchi et al. | 384/448 |
| 5,636,848 A * | 6/1997 | Hager et al. | 277/420 |
| 6,092,809 A | 7/2000 | Keifer et al. | |
| 6,231,136 B1 | 5/2001 | Freeman | |
| 6,880,901 B2 * | 4/2005 | Tamaru | 305/109 |
| 7,311,363 B2 | 12/2007 | Suma | |
| 7,757,402 B2 | 7/2010 | Seo et al. | |
| 7,946,611 B2 | 5/2011 | Chavez et al. | |
| 2009/0085303 A1 | 4/2009 | Kometani et al. | |

* cited by examiner

*Primary Examiner* — Tashiana Adams
*Assistant Examiner* — Jacob Knutson
(74) *Attorney, Agent, or Firm* — Liell & McNeil

(57) ABSTRACT

A final drive assembly is used to support a track chain on a track type machine. The final drive assembly includes a sprocket hub mounted for rotation on a fixed hub. A seal is positioned between the fixed hub and the sprocket hub. The fixed hub and the sprocket hub define a seal protection passageway that extends between an outer surface and the seal. The seal protection passageway includes a labyrinth located between an annular attachment flange and the seal along a rotation axis of the sprocket hub. The outer surface includes a valley between a sprocket mount of the sprocket hub and a machine mount of the fixed hub. The seal protection passageway opens at a greater radius than a minimum radius of the valley.

20 Claims, 4 Drawing Sheets

FINAL DRIVE ASSEMBLY WITH SEAL GUARD FEATURES AND MACHINE USING SAME

TECHNICAL FIELD

The present disclosure relates generally to the final drive assemblies for machines, and more particularly to a seal protection strategy for a final drive assembly.

BACKGROUND

In certain applications, such as landfills, forestry work, demolition and other environments, wire, nylon rope, vines and various other forms of debris can wind around the final drives of a track type machine during operation. This wound debris eventually pulls taut and can penetrate into the cavity that houses the final drive rotating and stationary seals. Over time, the wound material can destroy the seals, and allow the lubricating fluid within the final drive assembly to escape. Loss of lubrication can cause damage and/or failure of the internal final drive components. In addition, the wound debris can wear away the exposed ends of bolts that facilitate the attachment of the final drive assembly to the machine. This wear can make it extremely difficult to detach a final drive assembly from a machine, further complicating problems associated with servicing final drive assemblies prior to or after being damaged due to seal failure.

In some currently available final drive assemblies, a steel labyrinth is integrated with Kevlar rope to inhibit entry of debris into a seal protection passageway that extends between the fixed portion of the final drive assembly that is attached to the machine, and the rotating portion. Further protection against entry of debris is provided by a protective shell or clam shell that covers the entry opening to the seal protection passageway. For instance, this type of final drive assembly can be seen on Caterpillar D8 Track Type Tractors. Although this type of guarded final drive has performed well for many years, there remains room for improvement. For instance, it is sometimes difficult to remove track debris and often difficult to remove the protective clam shells. In general, customers want a robust factory final drive duo-cone seal guarding solution that does not require routine maintenance.

The present disclosure is directed to overcoming one or more of the problems set forth above.

SUMMARY OF THE DISCLOSURE

In one aspect, a machine includes a final drive assembly attached to each side of a machine body. A track chain is supported by the final drive assembly. The final drive assembly includes a sprocket hub mounted for rotation on a fixed hub about a rotation axis. The final drive assembly includes a seal positioned between the fixed hub and the sprocket hub. The fixed hub and the sprocket hub define a seal protection passageway that extends between an outer surface of the final drive assembly and the seal. The seal protection passageway includes a labyrinth located between the machine body and the seal along the rotation axis. The outer surface includes a valley between a sprocket mount of the sprocket hub and a machine mount of the fixed hub. The seal protection passageway opens at a greater radius than a minimum radius of the valley.

In another aspect, a machine maneuvers by moving a track chain around a final drive assembly. When the track chain is moving, a sprocket hub of the final drive assembly rotates with respect to a fixed hub about a rotation axis. Lubricant oil is held in the final drive assembly with a seal positioned between the sprocket hub and the fixed hub. The seal is protected from winding debris by positioning the seal at one end of a seal protection passageway that includes an labyrinth and an opening to an outer surface of the final drive assembly. The seals are further protected by locating the opening on a machine side of a valley defined by the final drive assembly at a radius from the rotation axis that is greater than a minimum radius of the valley.

DETAILED DESCRIPTION

Figure 1:
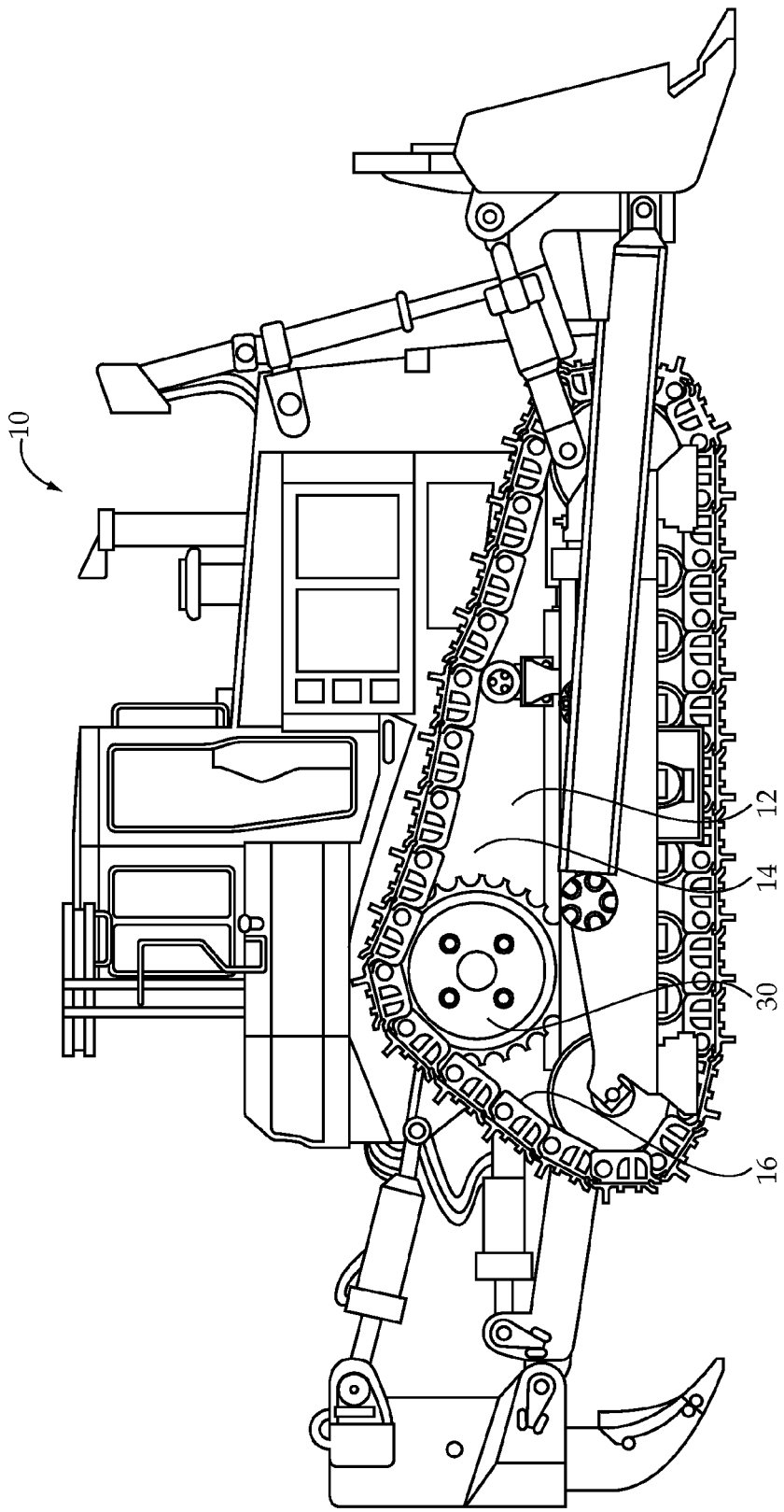
FIG. 1 is a side view of a machine according to the present disclosure.

Referring to FIG. 1, a machine 10 which may be a track type tractor, includes a machine body 12. A final drive assembly 30 is attached to each side 14 of machine body 12 and supports a track chain 16. As well known in the art, machine 10 maneuvers by moving track chain 16 around final drive assembly 30.

Figure 2:
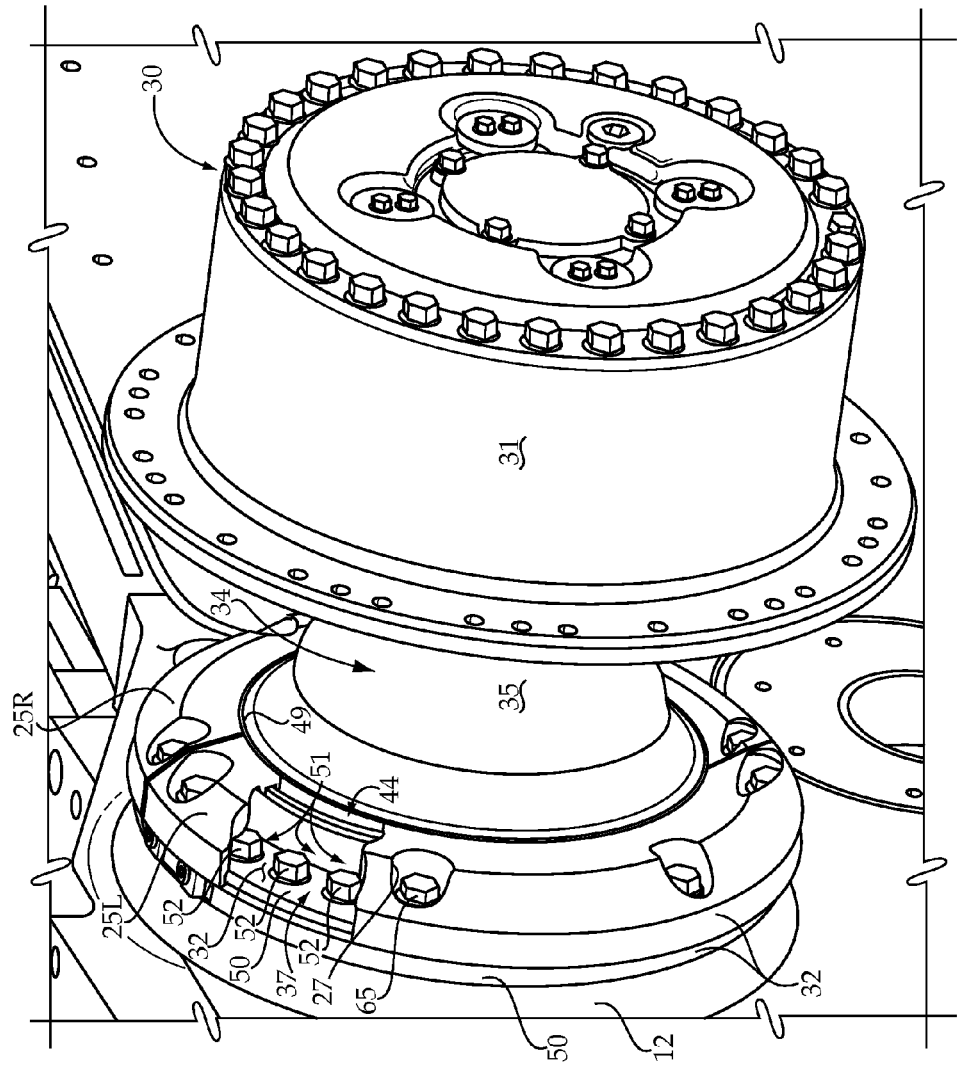
FIG. 2 is a perspective view of a final drive assembly attached to the machine of FIG. 1.
Figure 3:
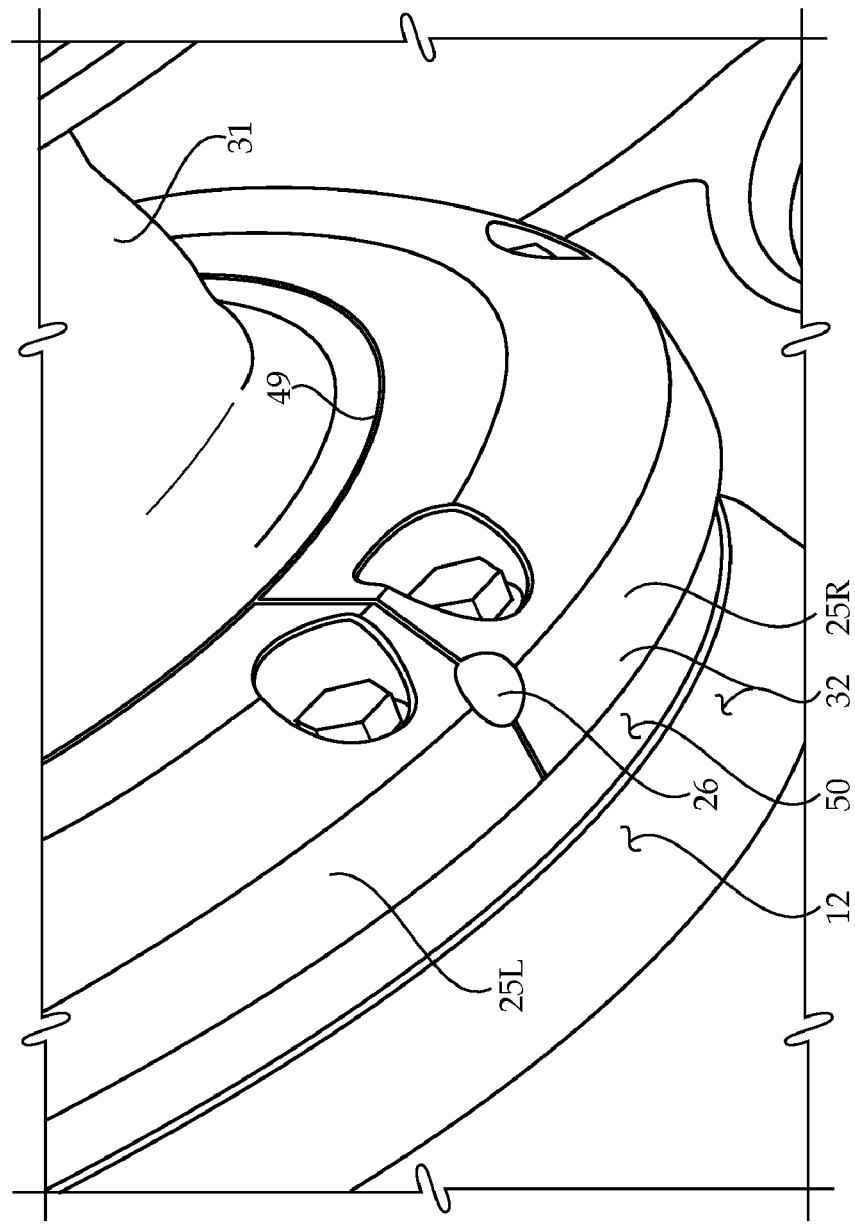
FIG. 3 is an enlarged alternative perspective view of a portion of the final drive assembly of FIG. 2.
Figure 4:
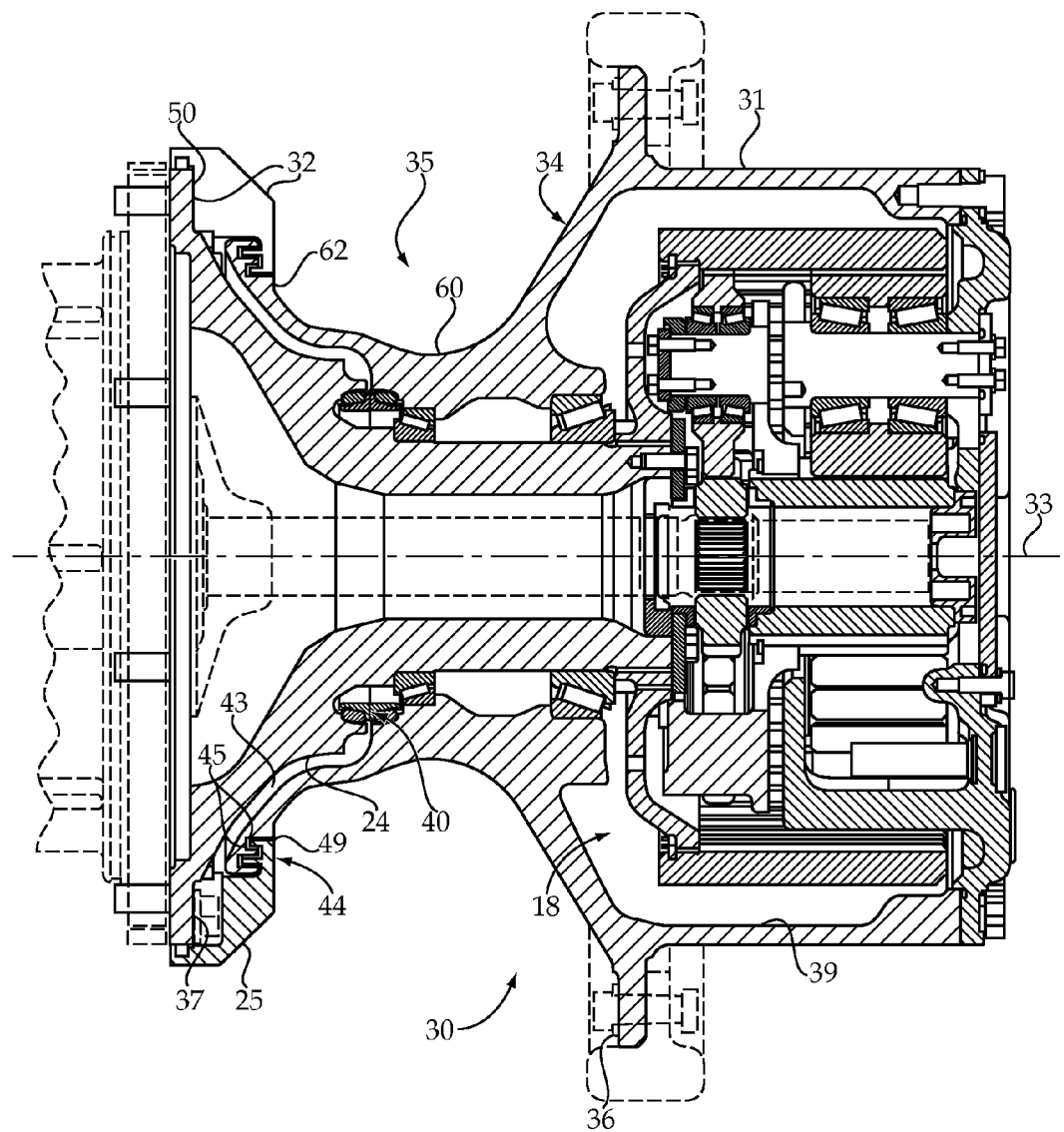
FIG. 4 is a sectioned view through the final drive assembly of FIG. 2.

Referring now to FIGS. 2-4, final drive assembly 30 according to the present disclosure has two main components, a fixed hub 32 that is attached to, and remains fixed with respect to, machine body 12 via a machine mount 37, and a sprocket hub 31 that is mounted for rotation with respect to the fixed hub 32 about a rotation axis 33. Together, sprocket hub 31 and fixed hub 30 define an interior 39 that houses a planetary gear set 18 that facilitates the transfer of power from machine 10 to cause rotation of sprocket hub 31, to in turn drive the track chain 16. Interior 39 is at least partially filled with lubricating oil to facilitate lubrication of the various moving components associated with planetary gear set 18. A seal 40, which may be a conventionally known duo-cone seal, has two primary functions; first, keep the lubrication oil in interior 39, and second, keep debris, dirt and other non-lubricants out of interior 39. As such, those skilled in the art will appreciate that proper lubrication of, and hence proper functioning of, final drive assembly 30 relies upon maintaining the integrity of seal 40 even when machine 10 is being operated in a hostile environment.

The present disclosure teaches a number of features for protecting the integrity of seal 40 from potential damage or destruction that could undermine the integrity of seal 40 and allow needed lubricant to escape from interior 39. Protection of seal 40 begins by the fixed hub 32 and the sprocket hub 31 defining a seal protection passageway 43 that extends between an outer surface 34 of the final drive assembly 30 and the seal 40. The seal protection passageway 43 may include a labyrinth 44 located between machine mount 37 and the seal 40 along the rotation axis 33 of sprocket hub 31. According to the present disclosure, a labyrinth means a tortuous pathway that includes numerous turns, when viewed in section, that make it extremely difficult for unwanted material that does manage to gain entry through opening 49 to find its way into potential harmful contact with seal 40. Although not necessary, when viewed in section, a labyrinth according to the present disclosure should have more than four 90° turns 45. In the illustrated embodiment, as best shown in FIG. 4, labyrinth 49 includes eight separate 90° turns 45. Those with skill in the art will recognize that reducing debris entry can be enhanced by making the passage through labyrinth 49 as thin as possible without causing significant rotational contact between sprocket hub 31 and fixed hub 32, which define opposite walls of the passage through labyrinth 44.

The outer surface 34 of final drive assembly 30 may include a valley 35 located between a sprocket mount 36 of sprocket hub 31 and the machine mount 37 of fixed hub 32. Intuitively, one could expect winding debris to initially accumulate at the minimum radius 60 of valley 35. Therefore, the present disclosure teaches locating the opening 49 to seal protection passageway 43 on the upward slope of valley 35, well away from minimum radius 60. In order to further inhibit entry of unwanted debris into seal protection passageway 43, opening 49 may preferably open through a portion 62 of outer surface 34 that is oriented perpendicular to rotation axis 33, as best shown in FIG. 4. It is believed that as winding debris accumulates in the valley 35, the windings become increasingly tighter, sometimes causing the underlying debris windings to be pushed in both directions along rotation axis 33. Thus, the present disclosure generally teaches locating opening 49 as far away as reasonable from minimum radius 60 to inhibit entry of debris into seal protection passageway 43 even when substantial debris has accumulated in valley 35.

Another aspect of the present disclosure relates to protecting the mounting features of the final drive assembly 30 to machine body 12. It has been observed that, even if one manages to prevent debris from contacting and damaging seal 40, repeated contact with debris can wear away the exposed ends of bolts used for attaching the final drive assembly to the machine body 12. The present disclosure addresses this issue by dividing fixed hub 32 into a base portion 24 and a pair of guard ring halves 25R and 25L. The machine mount 37 appears on base portion 24 as an annular attachment flange 50 that defines an array of machine fastener bores 51 at spaced locations around rotation axis 33. The fastener bores 51 receive bolts 52 that may be threaded to machine body 12 to facilitate attachment of final drive assembly 30 to machine 10 in a somewhat conventional manner. However, the fixed hub 32 includes the pair of guard ring halves 25 (25L and 25R) that cover the exposed ends 53 of bolts 52. Although not necessary, in the illustrated embodiment, the pair of guard ring halves 25L and 25R define the labyrinth 44 with sprocket hub 31. The pair of guard ring halves 25L and 25R may be attached to annular attachment flange 50 by fastener bolts 65 that are received through counter sunk bores 27. Alternatively, the fastener bolts 65 may extend through annular attachment flange 50 and instead be threaded into counterpart threaded bores defined by machine body 12 without departing from the present disclosure. By utilizing counter sunk bores 27, the exposed ends of fastener bolts 65 are protected from much of the friction contact with debris, especially winding debris that may rub against the outer surface of the guard ring halves 25L and 25R during normal operation of machine 10 in a debris filled environment. Although each guard ring halve 25L and 25R occupy on half of a 360° ring, non equal proportions would not depart from the disclosure. For instance, a first ring half of 120° coupled with a second ring half of 240° would be within the contemplated scope of the disclosure.

Apart from winding debris, mud and other liquid debris has been known to make its way into seal protection passageways. Under certain circumstances, trapped mud can be forced toward seal 40, such as by winding debris that effectively closes a segment of labyrinth 44. In order to encourage the escape of liquid debris from seal protection passageway 43, the pair of guard ring halves 25L and 25R may define a drain passage 26 that is fluidly connected to the seal protection passageway 43 at a location between labyrinth 44 and seal 40. In addition, drain passage 26 may preferably be located at a vertical low point in order to exploit the action of gravity and help to drain any liquid from seal protection passage 43. In addition, by locating the drain passage 26 at a larger radius than a bulk of seal protection passageway 43, the rotation of sprocket hub 31 can induce a centrifugal force action, again urging any liquid debris, such as mud, toward an outer radius and eventually out through drain opening 26.

INDUSTRIAL APPLICABILITY

The present disclosure is generally applicable to final drives for any machine that may be operated in hostile environments that include winding debris that could accumulate on the final drive assembly and eventually threaten the integrity of the seal. The present disclosure is particularly applicable to final drive assemblies for track type machines used in land fill, forestry, demolition and other applications where winding and other threatening debris (e.g., mud) exists. Although the final drive assembly of the present disclosure is illustrated in the context of a track type machine, it could find potential application for other off road machines that include final drive assemblies of a similar structure. In such a case, the identified sprocket hub might support a wheel instead of a sprocket as in the illustrated embodiment. In any event, such an alternative would not be beyond the scope of the present disclosure, notwithstanding the use of the term "sprocket".

When in operation, machine 10 may maneuver by moving track chain 16 around final drive assembly 30. When this occurs, the sprocket 31 will rotate with respect to the fixed hub 32 about the rotation axis 33. This action is created by a drive shaft extending from machine body 12 into the spline of a planetary gear assembly 18 located in interior 39. The planetary gear assembly 18 generally needs lubricant oil. That lubricant oil is held in interior 39 of final drive assembly 30 by the seal 40, such as a duo-cone seal, positioned between sprocket hub 31 and fixed hub 32. Seal 40 is protected from winding debris by positioning the seal 40 at one end of the seal protection passageway 43. This protection is enhanced by including a labyrinth 44 in the seal protection passageway 43, and positioning an opening 49 of the seal protection passageway on a machine side of valley 35, which is defined by the outer surface 34 of final drive assembly 30. Furthermore, the opening is preferably positioned at a radius from rotation axis 33 that is greater than the minimum radius 60 of valley 35. Liquid that may find its way into seal protection passageway 43 may be urged toward a drain opening 26 with centrifugal force when sprocket hub 31 is rotating with respect to fixed hub 32.

Wear on bolts 52 that attach final drive assembly 30 to machine body 12 is avoided by covering the exposed ends 53 of the bolts 52 with a pair of guard ring halves 25L and 25R, which define a portion of the labyrinth 44. Finally, the seal 40 may be further protected by locating the opening 49 through a portion 62 of outer surface 34 that is oriented perpendicular to rotation axis 33. Finally, the labyrinth may include more than four 90° turns in order to make it extremely difficult for debris that does manage to enter opening 49 from making it passed the labyrinth 44 toward potential contact with seal 40.

Track type tractor machines 10 of the type illustrated in FIG. 1 are often available in both standard configurations utilizing a track chain standard with shoes, and also available in a low pressure version that utilize a similar track chain but with extra wide shoes. The structure of the present disclosure offers a subtle but important advantage with regard to these options. The illustrated embodiment showed a standard final drive assembly for machine 10, but a low pressure version of a final drive assembly for machine 10 could utilize most of the components associated with the illustrated standard final drive assembly. The low pressure version could use an identical internal components (planetary gear assembly 18) and an identical sprocket hub 31, but would require a different fixed hub 31. The different fixed hub would have a longer based hub portion 24 so that the final drive assembly could accommodate wider track shoes and would also require a deeper dish pair of guard ring halves 25L and 25R. In the past, low pressure versions of the same machine required both different sprocket hubs 32 and different fixed hubs 31 than that of the counterpart standard design. Thus, the present disclosure offers an opportunity for cost savings in allowing the use of the same expensive sprocket hub 31 on both standard and low pressure versions of machine 10.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A machine comprising:
a machine body;
a final drive assembly attached to each side of the machine body;
a track chain supported by the final drive assembly;
the final drive assembly includes sprocket hub mounted for rotation on a fixed hub;
the final drive assembly including a seal positioned between the fixed hub and the sprocket hub;
the fixed hub and the sprocket hub defining a seal protection passageway that extends between an outer surface of the final drive assembly and the seal;
the seal protection passageway includes a labyrinth located between the machine body and the seal along a rotation axis of the sprocket hub;
the outer surface includes a valley between a sprocket mount of the sprocket hub and a machine mount of the fixed hub; and
the seal protection passageway has an opening that opens at a greater radius than a minimum radius of the valley, and a segment of the labyrinth being further from the rotation axis than the opening.

2. The machine of claim 1 wherein the seal protection passageway opens through a portion of the outer surface oriented perpendicular to the rotation axis.

3. The machine of claim 1 wherein the labyrinth includes more than four ninety degree turns.

4. The machine of claim 1 wherein the machine mount includes an annular attachment flange that defines an array of machine fastener bores that receive bolts threaded to the machine body; and
the fixed hub includes a pair of guard ring halves covering an exposed end of the bolts.

5. The machine of claim 4 wherein the pair of guard ring halves and the sprocket hub define the labyrinth.

6. The machine of claim 5 wherein the pair of guard ring halves define a drain passage that is fluidly connected to the seal protection passageway between the labyrinth and the seal.

7. The machine of claim 6 wherein the pair of guard rings are attached to the annular attachment flange by fasteners received through countersunk bores defined by the pair of guard rings.

8. The machine of claim 7 wherein the seal protection passageway opens through a portion of the outer surface oriented perpendicular to the rotation axis.

9. The machine of claim 8 wherein the labyrinth includes more than four ninety degree turns.

10. A final drive assembly comprising:
a sprocket hub mounted for rotation on a fixed hub;
a seal positioned between the fixed hub and the sprocket hub;
the fixed hub and the sprocket hub defining a seal protection passageway that extends between an outer surface and the seal;
the seal protection passageway includes a labyrinth located between an annular attachment flange and the seal along a rotation axis of the sprocket hub;
the outer surface includes a valley between a sprocket mount of the sprocket hub and a machine mount of the fixed hub; and
the seal protection passageway has an opening that opens at a greater radius than a minimum radius of the valley, and a segment of the labyrinth being further from the rotation axis than the opening.

11. The final drive assembly of claim 10 wherein the seal protection passageway opens through a portion of the outer surface oriented perpendicular to the rotation axis.

12. The final drive assembly of claim 10 wherein the labyrinth includes more than four ninety degree turns.

13. The final drive assembly of claim 10 wherein the machine mount includes the annular attachment flange that defines an array of machine fastener bores that receive bolts for threaded attachment to a machine body; and
the fixed hub includes a pair of guard ring halves covering an exposed end of the bolts.

14. The final drive assembly of claim 13 wherein the pair of guard ring halves and the sprocket hub define the labyrinth.

15. The final drive assembly of claim 13 wherein the pair of guard ring halves define a drain passage that is fluidly connected to the seal protection passageway between the labyrinth and the seal.

16. The final drive assembly of claim 13 wherein the pair of guard rings are attached to the annular attachment flange by fasteners received through countersunk bores defined by the pair of guard rings.

17. A method of operating a machine, comprising the steps of:
maneuvering the machine by moving a track chain around a final drive assembly that includes a sprocket hub mounted for rotation on a fixed hub; a seal positioned between the fixed hub and the sprocket hub; the fixed hub and the sprocket hub defining a seal protection passageway that extends between an outer surface and the seal; the seal protection passageway includes a labyrinth located between an annular attachment flange and the seal along a rotation axis of the sprocket hub; the outer surface includes a valley between a sprocket mount of the sprocket hub and a machine mount of the fixed hub; and the seal protection passageway has an opening that opens at a greater radius than a minimum radius of the valley, and a segment of the labyrinth being further from the rotation axis than the opening;
the moving step includes rotating the sprocket hub of the final drive assembly with respect to the fixed hub of the final drive assembly about the rotation axis;
holding lubricant oil in the final drive assembly with the seal positioned between the sprocket hub and the fixed hub;

protecting the seal from winding debris by positioning the seal at one end of the seal protection passageway that includes the labyrinth and opens at the opening to the outer surface of the final drive assembly; and the protecting step further includes locating the opening on a machine side of the valley defined by the final drive assembly at a radius from the rotation axis that is greater than the minimum radius of the valley.

18. The method of claim 17 including a step of urging liquid in the seal protection passageway toward a drain opening with centrifugal force when the sprocket hub is rotating with respect to the fixed hub.

19. The method of claim 18 including a step of avoiding wear on bolts that attach the final drive assembly to a machine body by covering the bolts with a pair of guard ring halves that define a porting of the labyrinth.

20. The method of claim 19 wherein the protecting step further includes locating the opening through a portion of the outer surface oriented perpendicular to the rotation axis; and including more than four ninety degree turns in the labyrinth.

* * * * *